United States Patent
Nguyen et al.

(10) Patent No.: US 10,570,718 B2
(45) Date of Patent: Feb. 25, 2020

(54) CAPTURE AND RECOVERY EXHAUST GAS FROM MACHINERY LOCATED AND OPERATED AT A WELL SITE

(71) Applicant: Halliburton Energy Services, Inc., Houston, TX (US)

(72) Inventors: Philip D. Nguyen, Houston, TX (US); Stanley V. Stephenson, Duncan, OK (US); Jim Basuki Surjaatmadja, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/330,345

(22) PCT Filed: Nov. 14, 2016

(86) PCT No.: PCT/US2016/061789
§ 371 (c)(1),
(2) Date: Mar. 4, 2019

(87) PCT Pub. No.: WO2018/089026
PCT Pub. Date: May 17, 2018

(65) Prior Publication Data
US 2019/0226313 A1    Jul. 25, 2019

(51) Int. Cl.
*E21B 43/26* (2006.01)
*E21B 43/24* (2006.01)
*E21B 43/267* (2006.01)
*E21B 41/00* (2006.01)

(52) U.S. Cl.
CPC ........ *E21B 43/267* (2013.01); *E21B 41/0064* (2013.01); *B01D 2257/504* (2013.01); *E21B 43/24* (2013.01)

(58) Field of Classification Search
CPC ........ E21B 43/164; E21B 36/02; E21B 43/24; E21B 43/006; E21B 43/34; E21B 47/022
See application file for complete search history.

(56) References Cited

U.S. PATENT DOCUMENTS

| | | |
|---|---|---|
| 4,112,051 A | 9/1978 | Sartori et al. |
| 5,339,633 A | 8/1994 | Fujii et al. |
| 5,665,319 A | 9/1997 | Hirama et al. |
| 6,596,248 B2 | 7/2003 | Schimkat et al. |

(Continued)

FOREIGN PATENT DOCUMENTS

WO    2014-146142 A1    9/2014

OTHER PUBLICATIONS

International Search Report & Written Opinion issued for corresponding International Application No. PCT/US2016/061789 dated Jul. 28, 2017. (13 pages).

(Continued)

*Primary Examiner* — Zakiya W Bates
(74) *Attorney, Agent, or Firm* — McGuireWoods LLP (57) ABSTRACT

A variety of systems, methods, and compositions that relates generally to well site operations and, more particularly, to the capture and recovery of exhaust gas from machinery located and operated at a well site are disclosed. Exhaust gas comprising carbon dioxide is captured, absorbed or reacted with amine sources, and separated for reuse or further processed for use in subterranean formation operations, such as hydraulic fracturing operations.

18 Claims, 3 Drawing Sheets

(56) References Cited

U.S. PATENT DOCUMENTS

| | | |
|---|---|---|
| 7,488,463 B2 | 2/2009 | Iijima et al. |
| 7,703,528 B2 | 4/2010 | Schultz et al. |
| 7,770,640 B2 | 8/2010 | Kresnyak et al. |
| 8,361,425 B2 | 1/2013 | Lund et al. |
| 8,500,860 B2 | 8/2013 | Eisenberger |
| 8,568,520 B2 | 10/2013 | Ohashi et al. |
| 8,641,994 B2 | 2/2014 | Woodhouse et al. |
| 8,795,618 B2 | 8/2014 | Ji et al. |
| 9,028,785 B2 | 5/2015 | Kortunov et al. |
| 9,034,288 B2 | 5/2015 | Baugh et al. |
| 9,155,990 B2 | 10/2015 | Graff et al. |
| 9,186,617 B2 | 11/2015 | Calabro et al. |
| 9,266,052 B2 | 2/2016 | Wright et al. |
| 9,297,285 B2 | 3/2016 | Hamad |
| 2009/0238988 A1 | 9/2009 | McDaniel et al. |
| 2009/0255670 A1* | 10/2009 | Koyama ............... E21B 43/006 166/252.1 |
| 2011/0174196 A1 | 7/2011 | Murray et al. |
| 2012/0166096 A1 | 6/2012 | Stephenson et al. |
| 2013/0062065 A1* | 3/2013 | Macadam ............... E21B 36/02 166/302 |
| 2014/0024800 A1 | 1/2014 | Chu |
| 2014/0151051 A1 | 6/2014 | Lissianski et al. |
| 2014/0205525 A1 | 7/2014 | Kortunov et al. |
| 2014/0338906 A1 | 11/2014 | Monastiriotis et al. |
| 2015/0338098 A1 | 11/2015 | Boulet |
| 2015/0360168 A1 | 12/2015 | Zubrin et al. |

OTHER PUBLICATIONS

Morsey, et al., "Improving Hydraulic Fracturing of Shale Formations by Acidizing", Society of Petroleum Engineers, doi:10.2118/165688-MS, (Aug. 20, 2013). (15 pages).

* cited by examiner

CAPTURE AND RECOVERY EXHAUST GAS FROM MACHINERY LOCATED AND OPERATED AT A WELL SITE

BACKGROUND

The embodiments herein relate generally to well site operations and, more particularly, to the capture and recovery of exhaust gas from machinery located and operated at a well site.

Oil and gas wells produce oil, gas, and/or byproducts from subterranean formation hydrocarbon reservoirs. A variety of subterranean formation operations are utilized to obtain such hydrocarbons, such as drilling operations, completion operations, stimulation operations, production operations, enhanced recovery operations, and the like. Such subterranean formation operations typically use a large number of vehicles, heavy equipment, and other apparatuses (collectively "machinery" herein) in order to achieve certain job requirements, such as treatment fluid pump rates. Such equipment may include, for example, pump trucks, sand trucks, cranes, conveyance equipment, mixing machinery, and the like. Many of these operations machinery utilize combustion engines that produce exhaust gas (e.g., carbon dioxide greenhouse emissions) that are emitted into the atmosphere. Such atmospheric exhaust gas can be hazardous to the environment and the health of human and animal life.

Carbon dioxide if captured at a wellsite may be reusable, as gases are often used in subterranean formation operations alone or in combination with other compounds. For example, carbon dioxide has been used to lower hydrostatic pressure, as an energized fluid, as foamed treatment fluids where the gas provides foaming qualities, as part of swellable polymer compositions for cementing operations, and the like. Such reusable carbon dioxide could prevent or reduce atmospheric carbon dioxide produced at a well site, while beneficially reusing it to lower operational costs and operational well site time.

BRIEF DESCRIPTION OF THE DRAWINGS

The following figures are included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The embodiments herein relate generally to well site operations and, more particularly, to the capture and recovery of exhaust gas from machinery located and operated at a well site.

The embodiments of the present disclosure provide for capturing and recovering, and some instances reusing, exhaust gas comprising carbon dioxide ($CO_2$) from machinery located and operated at a well site to at least reduce atmospheric $CO_2$ emissions. Other such advantages of the present disclosure include the use of readily available, and thus less costly, compounds to capture and absorb $CO_2$ from exhaust gas at well sites; the $CO_2$ that has been captured and absorbed can be desorbed or otherwise released for reuse (e.g., for downhole treatment operations, such as stimulation operations); the compounds used to capture and absorb the $CO_2$ can similarly be recycled; the captured and absorbed $CO_2$ can be transformed into a polyurea polymer for other uses (e.g., proppant particulate coating for use in subterranean formation as a consolidating agent); among other advantages.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses +/−5% of a numerical value. For example, if the numerical value is "about 5," the range of 4.75 to 5.25 is encompassed. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

The use of directional terms such as above, below, upper, lower, upward, downward, left, right, uphole, downhole and the like are used in relation to the illustrative embodiments as they are depicted in the figures herein, the upward direction being toward the top of the corresponding figure and the downward direction being toward the bottom of the corresponding figure, the uphole direction being toward the surface of the well and the downhole direction being toward the toe of the well. Additionally, the embodiments depicted in the figures herein are not necessarily to scale and certain features are shown in schematic form only or are exaggerated or minimized in scale in the interest of clarity.

Figure 1:
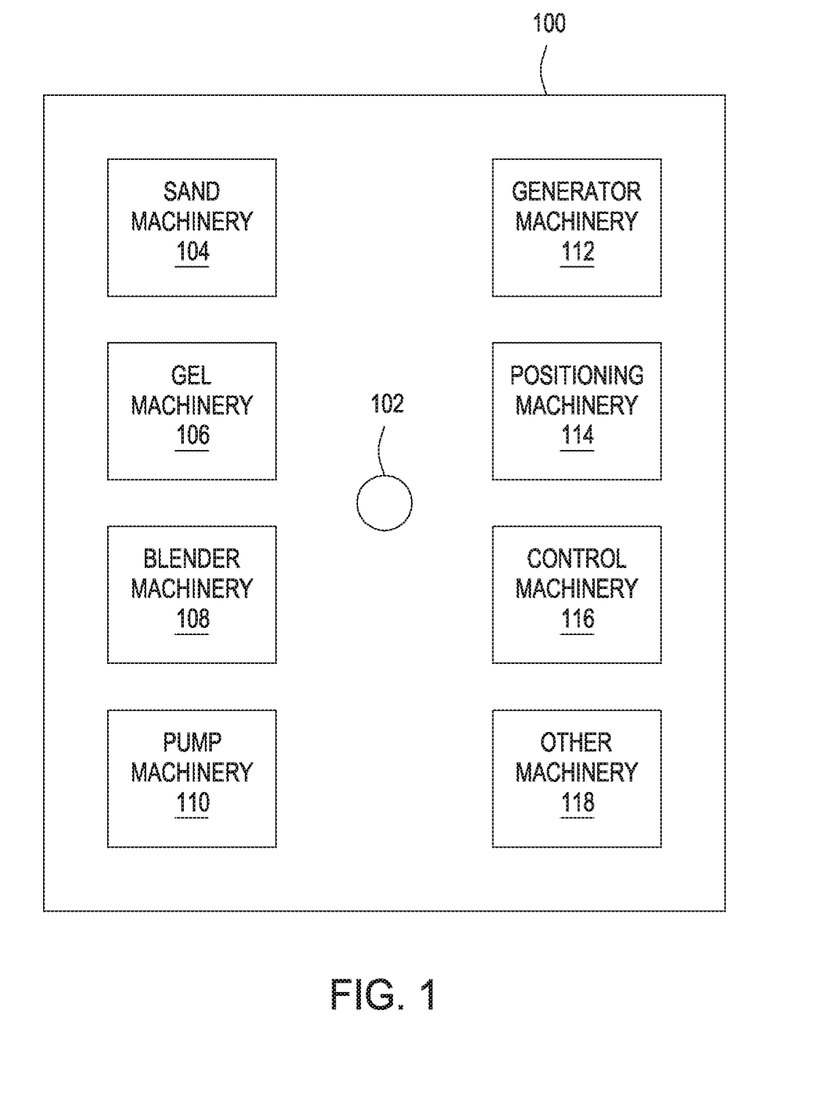
FIG. 1 depicts a plurality of machinery that may be located and operated at a well site for performing a subterranean formation operation, according to one or more embodiments of the present disclosure.

FIG. 1 depicts a plurality of machinery that may be located and operated at a well site for performing a subterranean formation operation, according to one or more embodiments of the present disclosure. The well site 100 may comprise a wellbore 102 for which machinery is used to perform a formation operation. The machinery may include one or more internal combustion or other suitable engines that consume fuel to perform work at the site 100 and produce exhaust gas comprising $CO_2$.

The wellbore 102 may be a hydrocarbon-producing wellbore (e.g., oil, natural gas, and the like) or another type of wellbore for producing other resources (e.g., mineral exploration, mining, and the like). FIG. 1, however, depicts a well site 100 having machinery typically associated with a subterranean formation operation related to a hydrocarbon-producing wellbore, where such operations may comprise, for example, a cementing operation, a fracturing operation, or other suitable operation where equipment is used to drill, complete, produce, enhance production, and/or work over the wellbore 102. Although not shown, other surface operations may include, for example, operating or construction of a facility.

With continued reference to FIG. 1, the well site 100, for the illustrated embodiment, includes various non-limiting machinery labeled as sand machinery 104, gel machinery 106, blender machinery 108, pump machinery 110, generator machinery 112, positioning machinery 114, control machinery 116, and other machinery 118. The machinery may be, for example, truck or rig-mounted, or otherwise present at the well site 100, without departing from the scope of the present disclosure. The sand machinery 104 may include transport trucks or other vehicles for hauling to and storing at the well site 100 sand for use in an operation. The gel machinery 106 may include transport trucks or other vehicles for hauling to and storing at the well site 100 materials used to make a gelled treatment fluid for use in an operation. The blender machinery 108 may include blenders, or mixers, for blending materials at the well site 100 for an operation. The pump machinery 110 may include pump trucks or other vehicles or conveyance equipment for pumping materials down the wellbore 102 for an operation. The generator machinery 112 may include generator trucks or other vehicles or equipment for generating electric power at the well site 100 for an operation. The electric power may be used by sensors, control machinery 116, and other machinery 118. The positioning equipment 114 may include earth movers, cranes, rigs or other equipment to move, locate or position equipment or materials at the well site 100 or in the wellbore 102.

The control machinery 116 may include an instrument truck coupled to some, all, or substantially all of the other equipment at the well site 100 and/or to remote systems or equipment. The control machinery 116 may be connected by wireline or wirelessly to other equipment to receive data for or during an operation. The data may be received in real-time or otherwise. In another embodiment, data from or for equipment may be keyed into the control machinery 116. The control machinery 116 may include a computer system for planning, monitoring, performing or analyzing the job. Such a computer system may be part of a distributed computing system with data sensed, collected, stored, processed and used from, at or by different equipment or locations. The other machinery 118 may comprise equipment also used at the well site 100 to perform an operation. In other examples, the other machinery 118 may comprise personal or other vehicles used to transport workers to the well site 100 but not directly used at the well site 100 for performing an operation.

Many if not most of these various machinery at the well site 100 accordingly utilize a diesel or other fuel types to perform their functionality. Such fuel is expended and exhausted as exhaust gas, such as exhaust gas comprising $CO_2$, considered a significant greenhouse gas and contributor to ocean acidification. The embodiments described herein provide a process for capturing, absorbing, and, when applicable, reusing $CO_2$ from such machinery located and operated at a well site, thus reducing atmospheric $CO_2$ emissions, while reducing material and time costs. It is to be appreciated that other configurations of the well site 100 may be employed, without departing from the scope of the present disclosure. FIG. 1 is merely an example to illustrate that a number of various machinery at a well site may utilize diesel or other fuel that creates exhaust gas comprising $CO_2$ that may be exhausted into the atmosphere.

In some embodiments described herein, the present disclosure provides a method comprising capturing exhaust gas comprising $CO_2$ from machinery located and operated at a well site. The exhaust gas may be captured into a first flow stream. As used herein, the term "flow stream," and grammatical variants thereof, refers to circulation or movement of a gaseous, liquid, solid, or combination phase composition to which force or pressure has been applied from one location to at least a second location. The first flow stream may be exposed to a second flow stream comprising an amine source. The first flow stream and second flow stream may be two tubulars, one tubular and an absorber tower, or a first tower containing the exhaust gas fluidly connected to an absorber tower containing the amine source.

The amine source is used to absorb $CO_2$, as such amine sources are able to form stable carbamates or bicarbonates with $CO_2$, referred to herein as a $CO_2$-amine complex. The $CO_2$-amine complex may then be heated and optionally pressurized to cause the separation of the $CO_2$-amine complex, thereby regenerating the $CO_2$ and regenerating the amine source. Both the regenerated $CO_2$ and the regenerated amine source may then be reused and recycled for use in subsequent operations, including the continued capture of exhaust gas $CO_2$ using the regenerated amine source. Mechanism 1 shows the chemical reaction of the absorption and regeneration of $CO_2$ and the amine source, as described herein.

Mechanism 1

As stated above, in some embodiments, the present disclosure provides a method of capturing exhaust gas comprising $CO_2$ into a first flow stream, where the exhaust gas is emitted from machinery located and operated at a well site. Thereafter, the first flow stream comprising the exhaust gas is exposed to a second flow stream comprising an amine source. At least a portion of the $CO_2$ is absorbed with the amine source, thereby forming the $CO_2$-amine complex. As used herein, the term "at least a portion," with reference to the absorption of the $CO_2$ with the amine source refers to the amine source absorbing at least 80% of the CO2 based on the available absorptivity of the amine source present. That is, if the amine source present (e.g., the concentration, type, etc.) has the theoretical capacity to absorb 100 ppm of $CO_2$, "at least a portion" covers the absorption of 80 ppm of $CO_2$ by the amine source. Thereafter, the $CO_2$-amine complex is separated, thereby regenerating the $CO_2$ and regenerating the amine source, such as by the application of heat (e.g., steam or direct heat).

Figure 2:
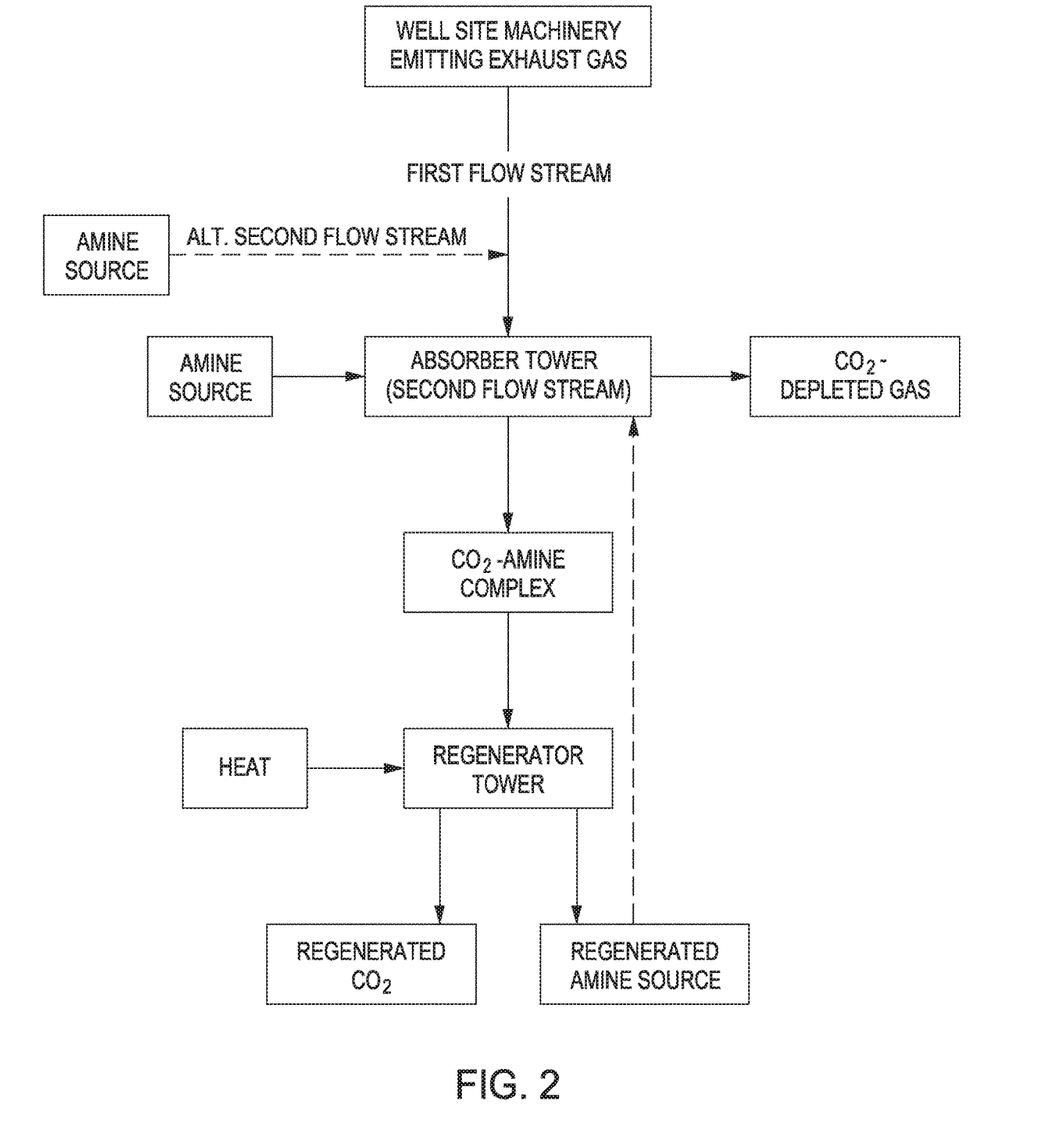
FIG. 2 depicts a schematic flowchart illustrating capturing, absorbing, and separating $CO_2$ from exhaust gas emitted from machinery located and operated at a well site, according to one or more embodiments of the present disclosure.

Referring now to FIG. 2, illustrated is a schematic flowchart depicting capturing, absorbing, and separating $CO_2$ from exhaust gas emitted from machinery located and operated at a well site, according to one or more embodiments of the present disclosure. As shown, exhaust gas comprising $CO_2$ emitting from machinery located and operated at a well site is captured into a first flow stream. In some embodiments, a fluid manifold (not shown) may be used in combination with a pump (not shown) to draw the exhaust gas into the first flow stream. The exhaust gas is then exposed to a second flow stream in an absorber tower. The absorber tower either comprises the amine source or the amine source is fed into the absorber tower before, after, or during the entry of the exhaust gas into the absorber tower from the first flow stream. In other embodiments, as shown in phantom in FIG. 2, an alternative ("Alt.") second flow stream may be exposed directly to the first flow stream prior to each flow stream reaching the absorber tower, without departing from the scope of the present disclosure. Moreover, a combination of the aforementioned second flow streams may be used in accordance with the teachings of the present disclosure.

In some embodiments, the first flow stream is exposed to the second flow stream (however configured) in countercurrent contact or concurrent contact. Countercurrent contact of the first flow stream and the second flow stream may be preferred to ensure maximum agitation and contact between the $CO_2$ in the exhaust gas and the amine source. For example, when an absorber tower is used as the second flow stream, the amine source in the absorber tower may be circulated in a direction countercurrent to the incoming first flow stream of the exhaust gas comprising the $CO_2$. In other embodiments, the amine solution may be static in the absorber tower serving as the second flow stream such that a countercurrent is produced by the incoming first flow stream of the exhaust gas comprising the $CO_2$. In still other embodiments, the exhaust gas comprising the $CO_2$ may be first circulated in the absorber tower and the amine source introduced in a direction countercurrent thereto.

Referring again to FIG. 2, the chemical reaction of the $CO_2$ in the exhaust gas and the amine source within the absorber tower forms the $CO_2$-amine complex described herein. Optionally, as shown in phantom, non-$CO_2$ gas or gas that is not forming part of a $CO_2$-amine complex (including residual $CO_2$) may be depleted or otherwise bled out of the absorber tower, such as by releasing a gas valve or other mechanism to bleed the non-complexed gas. The $CO_2$-amine complex may be transferred to a regenerator tower having heat supplied thereto in any form (e.g., steam, direct heat, radiation energy, and the like, and any combination thereof). Therein, the $CO_2$-amine complex is separated to form regenerated $CO_2$ and regenerated amine source. The absorber tower may, in some instances, be transported to another location away from the well site where the regenerator tower is located, or regeneration of the $CO_2$ and amine source may be performed using a regenerator tower located at the well site. In other instances, the $CO_2$-amine complex may be removed from the absorber tower and transferred offsite to another location for immediate storage or separation into the regenerated $CO_2$ and regenerated amine source using a regenerator tower or by any other means in which heat is appropriately supplied to the $CO_2$-amine complex.

In some embodiments, as shown in phantom in FIG. 2, the regenerated amine source is returned to the absorber tower second flow stream or to another storage tank for use in supplying the second flow stream formed within the absorber tower, such that the amine source is essentially wholly conserved. Alternatively, the regenerated amine source may be used in any other treatment or chemical reaction for use in the oil and gas industry or other industries, without departing from the scope of the present disclosure. For instance, the regenerated amine source may be stored and shipped to other users (e.g., sold) or locations for use.

In some embodiments, the regenerated $CO_2$ may be compressed and liquefied for future use. For example, the regenerated $CO_2$ may be compressed and liquefied for use in future subterranean formation operations, such as those described above, such as hydraulic fracturing operations or $CO_2$ flood operations for enhanced hydrocarbon recovery. That is, the regenerated $CO_2$ may be compressed and liquefied for introduction into a subterranean formation for performing any subterranean formation operation in which the regenerated $CO_2$ may be useful, at least as described herein. In other instances, the regenerated $CO_2$ may further be compressed and liquefied for use in any other treatment or chemical reaction for use in the oil and gas industry or other industries, without departing from the scope of the present disclosure. For instance, the regenerated $CO_2$ may be stored and shipped to other users (e.g., sold) or locations for use.

Indeed, low pH fluids have been shown to stimulate calcite-laden formations by etching the faces of generated fractures and helping generate microfractures along bedding planes. The regenerated, compressed, and liquefied $CO_2$ of the present disclosure is acidic in aqueous base fluid solution, and thus useful for such purposes. When dissolved in water it forms a weak acid called carbonic acid.

In some embodiments, the amine source is in solution in an aqueous base fluid. Suitable aqueous base fluids for forming a solution with the amine source may include, but are not limited to, fresh water, saltwater (e.g., water containing one or more salts dissolved therein), brine (e.g., saturated salt water), seawater, wastewater, produced water, and any combination thereof. When the amine source is in solution, it may be included in the aqueous base fluid in an amount of from about 10% to about 60% by weight of the aqueous base fluid, and preferably from about 20% to about 40% by weight of the aqueous base fluid, encompassing any value and subset therebetween.

The amine source for use in absorbing the $CO_2$ from machinery located and operated at a well site for later separation to for the regenerated $CO_2$ and regenerated amine source may be any amine source suitable for absorbing $CO_2$ from such machinery. In some embodiments, the amine source includes, but is not limited to, an alkanol amine selected from the group consisting of diethanolamine, mono methyl ethanolamine, monoethanolamine, aminoethylethanolamine, 2-(methylamino)ethanol, trithanolamine, methyl diethanolamine, diisopropanolamine, diglycolamine, and any combination thereof.

In other embodiments, the amine source is a polyamine source and rather than separating the absorbed $CO_2$ and the polyamine source, a carbamate salt is formed and then dehydrated to form a polyurea polymer precursor. Such polyurea polymer precursor may be used in a variety of applications in the oil and gas industry, as well as other industries. In such embodiments, accordingly, exhaust gas comprising $CO_2$ is captured from machinery located and operated at a well site into a first flow stream. The first flow stream is exposed to a polyamine source, which may be in a second flow stream as described above. For example, the polyamine source may be any polyamine that is capable of reacting with captured $CO_2$ to form a carbamate salt. The polyamine source may be a liquid or a solid at room temperature (RT), depending on the length of the carbon chain between the amino groups and any other functional groups present on the molecule. In preferred embodiments, the polyamine source is a liquid polyamine source. However, solid polyamine sources, or a combination of both solid and liquid polyamine sources may be used in accordance with the embodiments of the present disclosure. Liquid polyamine source may be contained in a tank, similar or the same as the absorber tower second flow stream described above, into which the first flow stream of exhaust gas is introduced. In such instances, in preferred embodiments, the absorber tower second flow stream comprising the liquid polyamine source is equipped with a stirrer or other mechanical mechanism for agitating or mixing the liquid polyamine source.

As described above, in at least some embodiments, the polyamine source is present in a second flow stream and the reaction between the $CO_2$ and the polyamine source occurs in the second flow stream upon the first flow stream comprising the CO2 being exposed to the second flow stream comprising the polyamine source. Upon contact of the exhaust gas comprising the $CO_2$ (e.g., first flow stream) and the polyamine source (e.g., second flow stream), the two react to form a carbamate salt. Thereafter, the carbamate salt is dehydrated to produce a polyurea polymer precursor. Dehydration is achieved in the presence of heat and pressure to facilitate the reaction kinetics of forming the polyurea polymer precursor. Mechanism 2 shows the reaction of exhaust gas comprising CO2 with a polyamine source to form carbamate salt and subsequent dehydration thereof to produce a polyurea polymer precursor.

Mechanism 2

The polyurea polymer may be used as a precursor for other polymer-containing materials, such as spandex (or elastane), polyurea coatings, polyurea elastomers, and the like. The polyurea polymer precursor is an elastomer and thus is effective as use as a resin coating for use in subterranean formation operation, such as for use as a consolidating agent to consolidate proppant packs, or a stabilizing agent for use in stabilizing formation fines and other unconsolidated particulates within a subterranean formation. In some embodiments, the polyurea polymer precursor is at least partially coated onto proppant particulates for use in a subterranean formation operation. As used herein, the term "proppant particulate" (or simply "proppant"), and grammatical variants thereof, refers to solid particulate materials used in a hydraulic fracturing process to serve as a physical barrier that prevents a fracture from fully closing. A collection of proppant particulates form a "proppant pack" having interstitial spaces between the proppant particulates through which produced fluids may flow. As used herein, the term "at least partially coated," and grammatical variants thereof, with reference to coating proppant particulates with any substance described herein means that at least 25% (and up to 100%) of the surface of the proppant particulate (or collection of proppant particulates, "proppant aggregates," if they aggregate prior to coating) is coated with the substance. As used herein, the term "proppant aggregate," and grammatical variants thereof, refers to a coherent body of proppant particulates, such that when the aggregate is placed into a fracture(s) or into a treatment fluid, the aggregate does not become dispersed into smaller bodies without the application of shear. For example, high shear caused by the proppant aggregates flowing through perforations may be sufficient to break up into individual particles or smaller aggregates.

In some embodiments, the polyamine source is at least partially coated onto proppant particulates and are in the first flow stream. If the polyamine source is in solid form, it may be coated onto the proppant particulates using a binder, tackifying agent, resin, or other adhesive to secure the polyamine source to the proppant particulate surface. The $CO_2$ from the captured exhaust gas in the first flow stream is then reacted with the polyamine source coated onto the proppant particulates, such as by exposing it to a second flow stream comprising the coated proppant particulates. Reaction of the CO2 with the polyamine source coated onto the proppant particulates thereby forms carbamate salt-coated proppant particulates.

In some embodiments, a treatment fluid may be prepared comprising the carbamate salt-coated proppant particulates (e.g., with at least an aqueous base fluid, as described above). The treatment fluid may then be introduced into a subterranean formation at a pressure above the fracture gradient of the subterranean formation to create or enhance at least one fracture therein. As used herein, the term "fracture gradient," and grammatical variants thereof, refers to the pressure required to induce fractures in a subterranean formation at a given depth. The carbamate salt-coated proppant particulates may be placed into the at least one fracture to form a proppant pack therein, and wherein dehydrating the carbamate salt to produce the polyurea polymer precursor occurs by exposure to the downhole environment, which applies pressure (e.g., fracture closure stress) and has an elevated downhole temperature, particularly as compared to RT. As used herein, the term "downhole environment," and grammatical variants thereof, refers to any subsurface portion of a wellbore in a subterranean formation, including fractures therein, and the conditions (e.g., temperature, pressure, and the like) therein.

The polyamine source for use in reacting with the $CO_2$ from machinery located and operated at a well site for later use in generating a polyurea polymer precursor may be any polyamine source suitable for reacting with the $CO_2$. In some embodiments, the polyamine source includes, but is not limited to, a primary amine, a secondary polyamine, a tertiary polyamine, a linear polyamine, a branched polyamine, a cyclic polyamine, an aromatic polyamine, an aliphatic polyamine, and any combination thereof. Specific examples of suitable polyamine sources include, but are not limited to, hexamethylenediamine, diethylenetriamine, ethylenediamine, and any combination thereof.

Examples of suitable materials for forming the proppant particulates of the present disclosure may include, but are not limited to, sand, ceramic materials, glass materials, polymer materials (e.g., polystyrene, polyethylene, etc.), nut shell pieces, wood, cements (e.g., Portland cements), fly ash, carbon black powder, silica, alumina, alumino-silicates, fumed carbon, carbon black, graphite, mica, titanium dioxide, barite, meta-silicate, calcium silicate, calcium carbonate, dolomite, nepheline syenite, feldspar, pumice, volcanic material, kaolin, talc, zirconia, boron, shale, clay, sandstone, mineral carbonates, mineral oxide, iron oxide, formation minerals, waste stream sources, man-made materials, low-quality manufactured materials, any of the aforementioned mixed with a resin to form cured resinous particulates, and any combination thereof. As used herein, the term "sand" refers to naturally occurring granular material composed of rock and mineral particulates (e.g., desert sand, beach sand). Nut shells may be from any fruit consisting of a hard or tough shell (encompassing seed and pit shells) including, but not limited to, pecan, walnut, pine, hazelnut, chestnut, acorn, brazil, candlenut, coconut, cashew, pistachio, and the like, and any combination thereof. The term "ceramic material" includes any inorganic crystalline material, compounded of a metal and a non-metal. Examples of suitable ceramics for use as the micro-proppant and/or proppant particulates herein include, but are not limited to, silicon carbide, cordierite, porcelain, alumina porcelain, high-voltage porcelain, lithia porcelain, cordierite refractory, alumina silica refractory, magnesium silicate, steatite, forsterite, titania, tatanate, and any combination thereof.

The shape of the various proppant particulates for use in the embodiments described herein may be of any shape capable of acting as propping material in a fracture. For example, the proppant particulates may be substantially spherical, fibrous, or polygonal in shape. As used herein, the term "substantially spherical," and grammatical variants thereof, refers to a material that has a morphology that includes spherical geometry and elliptic geometry, including oblong spheres, ovoids, ellipsoids, capsules, and the like and may have surface irregularities. As used herein, the term "fibrous," and grammatical variants thereof, refers to fiber-shaped substances having aspect ratios of greater than about 5 to an unlimited upper limit. The term "polygonal," and grammatical variants thereof, as used herein, refers to shapes having at least two straight sides and angles. Examples of polygonal proppant may include, but are not limited to, a cube, cone, pyramid, cylinder, rectangular prism, cuboid, triangular prism, icosahedron, dodecahedron, octahedron, pentagonal prism, hexagonal prism, hexagonal pyramid, and the like, and any combination thereof.

The mean proppant particulate size generally may range from about 2 mesh (1 cm) to about 400 mesh (0.04 mm) or less on the U.S. Sieve Series; however, in certain circumstances, other sizes or mixtures of sizes may be desired and will be entirely suitable for practice of the embodiments of the present disclosure. In particular embodiments, preferred mean proppant particulate size distribution ranges are one or more of 6/12 mesh (3.4 mm/1.7 mm), 8/16 mesh (2.4 mm/1.2 mm), 12/20 mesh (1.7 mm/0.84 mm), 16/30 mesh (1.2 mm/0.56 mm), 20/40 mesh (0.84 mm/0.4 mm), 30/50 mesh (0.60 mm/0.30 mm), 40/60 mesh (0.4 mm/0.25 mm), 40/70 mesh (0.40 mm/0.21 mm), or 50/70 mesh (0.30 mm/0.21 mm). In certain embodiments, the proppant particulates may be present in a treatment fluid in an amount of from about 0.01 pounds per gallon ("ppg") to about 30 ppg by volume of the treatment fluid, encompassing any value and subset therebetween (e.g., about 0.01 ppg to about 0.1 ppg, about 0.01 ppg to about 0.5 ppg, about 0.01 ppg to about 1 ppg, about 0.1 to about 1 ppg, about 1 ppg to about 10 ppg, about 1 ppg to about 30 ppg, about 5 ppg to about 20 ppg, or about 10 ppg to about 30 ppg). One ppg is equivalent to 119.96 grams per liter.

The treatment fluids described herein may further include one or more additives including, but not limited to, a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, and any combination thereof.

In various embodiments, systems configured for delivering the treatment fluids described herein to a downhole location are described. In various embodiments, the systems can comprise a pump fluidly coupled to a tubular, the tubular containing the treatment fluids described herein. It will be appreciated that while the system described below may be used for delivering any one of the treatment fluids described herein, each treatment fluid is delivered separately into the subterranean formation, unless otherwise indicated.

The pump may be a high pressure pump in some embodiments. As used herein, the term "high pressure pump" will refer to a pump that is capable of delivering a treatment fluid downhole at a pressure of about 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying particulate matter, such as the particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

Figure 3:
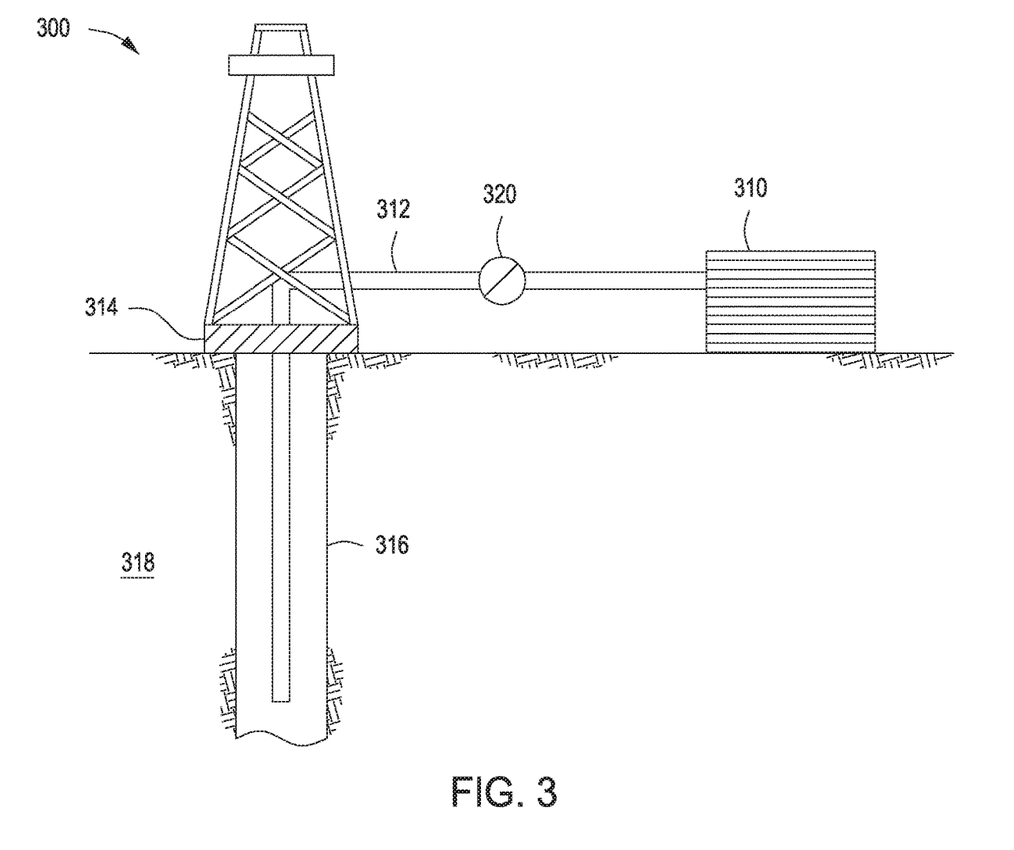
FIG. 3 depicts an embodiment of a system configured for delivering treatment fluids of the embodiments described herein to a downhole location, according to one or more embodiments of the present disclosure.

FIG. 3 shows an illustrative schematic of a system that can deliver the treatment fluids (i.e., comprising the carbamate salt-coated proppant particulates) of the present disclosure to a downhole location, according to one or more embodiments. It should be noted that while FIG. 3 generally depicts a land-based system, it is to be recognized that like systems may be operated in subsea locations as well. As depicted in FIG. 3, system 300 may include mixing tank 310, in which the treatment fluids of the embodiments herein may be formulated. The treatment fluids may be conveyed via line 312 to wellhead 314, where the treatment fluids enter tubular 316, tubular 316 extending from wellhead 314 into subterranean formation 318. Upon being ejected from tubular 316, the treatment fluids may subsequently penetrate into subterranean formation 318. Pump 320 may be configured to raise the pressure of the treatment fluids to a desired degree before introduction into tubular 316. It is to be recognized that system 300 is merely exemplary in nature and various additional components may be present that have not necessarily been depicted in FIG. 3 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 3, the treatment fluid or a portion thereof may, in some embodiments, flow back to wellhead 314 and exit subterranean formation 318. In some embodiments, the treatment fluid that has flowed back to wellhead 314 may subsequently be recovered and recirculated to subterranean formation 318, or otherwise treated for use in a subsequent subterranean operation or for use in another industry.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 3.

While various embodiments have been shown and described herein, modifications may be made by one skilled in the art without departing from the scope of the present disclosure. The embodiments described here are exemplary only, and are not intended to be limiting. Many variations, combinations, and modifications of the embodiments disclosed herein are possible and are within the scope of the disclosure. Accordingly, the scope of protection is not limited by the description set out above, but is defined by the claims which follow, that scope including all equivalents of the subject matter of the claims.

Embodiments disclosed herein include:

Embodiment A

A method comprising: capturing exhaust gas comprising carbon dioxide ($CO_2$) into a first flow stream, wherein the exhaust gas is exhausted from machinery located and operated at a well site; exposing the first flow stream to a second flow stream comprising an amine source; absorbing at least a portion of the $CO_2$ with the amine source, thereby forming a $CO_2$-amine complex; and separating the $CO_2$-amine complex, thereby regenerating the $CO_2$ and regenerating the amine source.

Embodiment A may have one or more of the following additional elements in any combination:

Element A1: Further compressing and liquefying the regenerated $CO_2$.

Element A2: Further compressing and liquefying the regenerated $CO_2$, and introducing it into a subterranean formation for performing a subterranean formation operation.

Element A3: Wherein the first flow stream is exposed to the second flow stream in countercurrent contact.

Element A4: Further comprising returning the regenerated amine source to the second flow stream.

Element A5: Wherein the second flow stream is present in an absorber tower, and any gas remaining after absorbing at least a portion of the $CO_2$ with the amine source is depleted from the absorber tower.

Element A6: Wherein the $CO_2$-amine complex is separated to regenerate the $CO_2$ and regenerate the amine source in a regeneration tower by supplying heat to the $CO_2$-amine complex.

Element A7: Wherein the second flow stream is present in an absorber tower, and any gas remaining after absorbing at least a portion of the $CO_2$ with the amine source is depleted from the absorber tower, and wherein the $CO_2$-amine complex is separated to regenerate the $CO_2$ and regenerate the amine source in a regeneration tower by supplying heat to the $CO_2$-amine complex, and the regenerated amine source is returned to the absorber tower.

Element A8: Wherein the $CO_2$-amine complex is separated to regenerate the $CO_2$ and regenerate the amine source at the well site.

Element A9: Wherein the $CO_2$-amine complex is first transported to a location away from the well site before it is separated to regenerate the $CO_2$ and regenerate the amine source.

Element A10: Wherein the amine source is an alkanol amine selected from the group consisting of diethanolamine, mono methyl ethanolamine, monoethanolamine, aminoethylethanolamine, 2-(methylamino)ethanol, trithanolamine, methyl diethanolamine, diisopropanolamine, diglycolamine, and any combination thereof.

Element A12: Wherein the amine source is in an aqueous solution comprising an aqueous base fluid.

By way of non-limiting example, exemplary combinations applicable to A include: A1-A12; A1, A2, and A9; A3 and A10; A4, A5, and A12; A6, A8, and A11; A9, A11, and A12; A1-A8 and A10-A12; A1-A7 and A9-A10; A1, A3, and A7; and any non-limiting combination of one or more of A1-A12.

Embodiment B

A method comprising: capturing exhaust gas comprising carbon dioxide ($CO_2$) into a first flow stream, wherein the exhaust gas is exhausted from machinery located and operated at a well site; exposing the first flow stream to a polyamine source; reacting the $CO_2$ with the polyamine source, thereby forming a carbamate salt; dehydrating the carbamate salt to produce a polyurea polymer precursor.

Embodiment B may have one or more of the following additional elements in any combination:

Element B1: Wherein the polyamine source is present in a second flow stream and reacting the $CO_2$ with the polyamine source to form the carbamate salt occurs in the second flow stream.

Element B2: Wherein the polyamine source is at least partially coated onto proppant particulates, and reacting of the $CO_2$ with the polyamine source forming the carbamate salt results in the proppant particulates being at least partially coated with the carbamate salt, thereby forming carbamate salt-coated proppant particulates.

Element B3: Wherein the polyamine source is at least partially coated onto proppant particulates, and reacting of the $CO_2$ with the polyamine source forming the carbamate salt results in the proppant particulates being at least partially coated with the carbamate salt, thereby forming carbamate salt-coated proppant particulates, and further comprising: providing a treatment fluid comprising the carbamate salt-coated proppant particulates; introducing the treatment fluid into a subterranean formation at a pressure above a fracture gradient pressure of the subterranean formation, thereby creating or enhancing at least one fracture; and placing the carbamate salt-coated proppant particulates into the at least one fracture, thereby forming a proppant pack or proppant aggregates; wherein dehydrating the carbamate salt to produce the polyurea polymer precursor occurs by exposure to a downhole environment, and the polyurea polymer precursor consolidates the proppant pack, forms proppant aggregates, or both consolidates the proppant pack and forms proppant aggregates.

Element B4: Wherein the polyamine source is at least partially coated onto proppant particulates, and reacting of the $CO_2$ with the polyamine source forming the carbamate salt results in the proppant particulates being at least partially coated with the carbamate salt, thereby forming carbamate salt-coated proppant particulates, and further comprising: providing a treatment fluid comprising the carbamate salt-coated proppant particulates; introducing the treatment fluid into a subterranean formation at a pressure above a fracture gradient pressure of the subterranean formation, thereby creating or enhancing at least one fracture; and placing the carbamate salt-coated proppant particulates into the at least one fracture, thereby forming a proppant pack or proppant aggregates; wherein dehydrating the carbamate salt to produce the polyurea polymer precursor occurs by exposure to a downhole environment, and the polyurea polymer precursor consolidates the proppant pack, forms proppant aggregates, or both consolidates the proppant pack and forms proppant aggregates; and further comprising a tubular extending into the subterranean formation and a pump fluidly coupled to the tubular, the tubular containing the treatment fluid.

Element B5: Wherein the polyamine source is a liquid polyamine source, a solid polyamine source, or a combination of a liquid polyamine source and a solid polyamine source.

Element B6: Wherein the polyamine source is selected from a primary amine, a secondary polyamine, a tertiary polyamine, a linear polyamine, a branched polyamine, a cyclic polyamine, an aromatic polyamine, an aliphatic polyamine, and any combination thereof.

Element B7: Wherein the polyamine source is selected from the group consisting of hexamethylenediamine, diethylenetriamine, ethylenediamine, and any combination thereof.

By way of non-limiting example, exemplary combinations applicable to B include: B1-B7; B1, B4, and B6; B5 and B7; B2, B3, and B7; B1, B3, B5, and B6; B5 and B6; B2 and B4; B3, B4, and B5; and any non-limiting combination of one or more of B1-B7.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
   capturing exhaust gas comprising carbon dioxide ($CO_2$) into a first flow stream, wherein the exhaust gas is exhausted from machinery located and operated at a well site;
   exposing the first flow stream to a second flow stream comprising an amine source;
   absorbing at least a portion of the $CO_2$ with the amine source, thereby forming a $CO_2$-amine complex; and
   separating the $CO_2$-amine complex, thereby regenerating the $CO_2$ and regenerating the amine source:
   reacting the regenerated $CO_2$ with the amine source, thereby forming a carbamate salt;
   dehydrating the carbamate salt to produce a polyurea polymer precursor,
      wherein dehydrating the carbamate salt to produce the polyurea polymer precursor occurs by exposure to a downhole environment, and the polyurea polymer precursor consolidates the proppant pack, forms proppant aggregates, or both consolidates the proppant pack and forms proppant aggregates.

2. The method of claim 1, wherein the first flow stream is exposed to the second flow stream in countercurrent contact.

3. The method of claim 1, further comprising returning the regenerated amine source to the second flow stream.

4. The method of claim 1, wherein the second flow stream is present in an absorber tower, and any gas remaining after absorbing at least a portion of the $CO_2$ with the amine source is depleted from the absorber tower.

5. The method of claim 1, wherein the $CO_2$-amine complex is separated to regenerate the $CO_2$ and regenerate the amine source in a regeneration tower by supplying heat to the $CO_2$-amine complex.

6. The method of claim 1, wherein the second flow stream is present in an absorber tower, and any gas remaining after absorbing at least a portion of the $CO_2$ with the amine source is depleted from the absorber tower, and
   wherein the $CO_2$-amine complex is separated to regenerate the $CO_2$ and regenerate the amine source in a regeneration tower by supplying heat to the $CO_2$-amine complex, and the regenerated amine source is returned to the absorber tower.

7. The method of claim 1, wherein the $CO_2$-amine complex is separated to regenerate the $CO_2$ and regenerate the amine source at the well site.

8. The method of claim 1, wherein the $CO_2$-amine complex is first transported to a location away from the well site before it is separated to regenerate the $CO_2$ and regenerate the amine source.

9. The method of claim 1, wherein the amine source is an alkanol amine selected from the group consisting of diethanolamine, mono methyl ethanolamine, monoethanolamine, aminoethylethanolamine, 2-(methylamino)ethanol, trithanolamine, methyl diethanolamine, diisopropanolamine, diglycolamine, and any combination thereof.

10. The method of claim 1, wherein the amine source is in an aqueous solution comprising an aqueous base fluid.

11. A method comprising:
    capturing exhaust gas comprising carbon dioxide ($CO_2$) into a first flow stream, wherein the exhaust gas is exhausted from machinery located and operated at a well site;
    exposing the first flow stream to a polyamine source;
    reacting the $CO_2$ with the polyamine source, thereby forming a carbamate salt;
    dehydrating the carbamate salt to produce a polyurea polymer precursor
       wherein dehydrating the carbamate salt to produce the polyurea polymer precursor occurs by exposure to a downhole environment, and the polyurea polymer precursor consolidates the proppant pack, forms proppant aggregates, or both consolidates the proppant pack and forms proppant aggregates.

12. The method of claim 11, wherein the polyamine source is present in a second flow stream and reacting the $CO_2$ with the polyamine source to form the carbamate salt occurs in the second flow stream.

13. The method of claim 11, wherein the polyamine source is at least partially coated onto proppant particulates, and reacting of the $CO_2$ with the polyamine source forming the carbamate salt results in the proppant particulates being at least partially coated with the carbamate salt, thereby forming carbamate salt-coated proppant particulates.

14. The method of claim 11, wherein the polyamine source is at least partially coated onto proppant particulates, and reacting of the $CO_2$ with the polyamine source forming the carbamate salt results in the proppant particulates being at least partially coated with the carbamate salt, thereby forming carbamate salt-coated proppant particulates, and further comprising:
    providing a treatment fluid comprising the carbamate salt-coated proppant particulates;
    introducing the treatment fluid into a subterranean formation at a pressure above a fracture gradient pressure of the subterranean formation, thereby creating or enhancing at least one fracture; and placing the carbamate salt-coated proppant particulates into the at least one fracture, thereby forming a proppant pack or proppant aggregates.

15. The method of claim 14, further comprising a tubular extending into the subterranean formation and a pump fluidly coupled to the tubular, the tubular containing the treatment fluid.

16. The method of claim 11, wherein the polyamine source is a liquid polyamine source, a solid polyamine source, or a combination of a liquid polyamine source and a solid polyamine source.

17. The method of claim 11, wherein the polyamine source is selected from a primary amine, a secondary polyamine, a tertiary polyamine, a linear polyamine, a branched polyamine, a cyclic polyamine, an aromatic polyamine, an aliphatic polyamine, and any combination thereof.

18. The method of claim 11, wherein the polyamine source is selected from the group consisting of hexamethylenediamine, diethylenetriamine, ethylenediamine, and any combination thereof.

* * * * *

UNITED STATES PATENT AND TRADEMARK OFFICE
CERTIFICATE OF CORRECTION

| | |
|---|---|
| PATENT NO. | : 10,570,718 B2 |
| APPLICATION NO. | : 16/330345 |
| DATED | : February 25, 2020 |
| INVENTOR(S) | : Philip D. Nguyen et al. |

Page 1 of 1

It is certified that error appears in the above-identified patent and that said Letters Patent is hereby corrected as shown below:

On the Title Page

Item (54) and In the Specification, Column 1, Lines 1-3, should read:
--CAPTURE AND RECOVERY OF EXHAUST GAS FROM MACHINERY LOCATED AND OPERATED AT A WELL SITE--

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*